(12) United States Patent
Ikegami et al.

(10) Patent No.: US 7,380,519 B2
(45) Date of Patent: Jun. 3, 2008

(54) PET LITTER BOX

(75) Inventors: Takeshi Ikegami, Tokyo (JP); Takayuki Matsuo, Tokyo (JP)

(73) Assignee: Uni-Charm Petcare Corporation, Tokyo (JP)

( * ) Notice: Subject to any disclaimer, the term of this patent is extended or adjusted under 35 U.S.C. 154(b) by 0 days.

(21) Appl. No.: 11/426,098

(22) Filed: Jun. 23, 2006

(65) Prior Publication Data

US 2006/0288948 A1    Dec. 28, 2006

(30) Foreign Application Priority Data

Jun. 27, 2005   (JP) .............................. 2005-187472

(51) Int. Cl.
*A01K 29/00*   (2006.01)
(52) U.S. Cl. .................. 119/167; 119/161; 119/165; 119/166; 119/169; 119/432
(58) Field of Classification Search ................ 119/161, 119/165, 166, 169, 432
See application file for complete search history.

(56) References Cited

U.S. PATENT DOCUMENTS

| | | | | |
|---|---|---|---|---|
| 3,455,277 A * | 7/1969 | Edwards | ...................... | 119/161 |
| 4,602,593 A * | 7/1986 | Gross | ...................... | 119/166 |
| 5,181,480 A * | 1/1993 | Dabolt | ...................... | 119/165 |
| 5,184,574 A * | 2/1993 | Kirk et al. | ................... | 119/162 |
| 5,193,488 A * | 3/1993 | Walton | ...................... | 119/166 |
| 6,209,486 B1 * | 4/2001 | Reynolds | ................... | 119/28.5 |
| 6,408,790 B1 * | 6/2002 | Maguire | ...................... | 119/166 |
| 6,412,440 B2 * | 7/2002 | Kobayashi | ................... | 119/161 |
| 2001/0013318 A1 * | 8/2001 | Kobayashi | ................... | 119/161 |
| 2002/0112669 A1 * | 8/2002 | Holt, Jr. | ...................... | 119/161 |
| 2004/0261727 A1 * | 12/2004 | Matsuo et al. | .............. | 119/170 |

FOREIGN PATENT DOCUMENTS

| | | |
|---|---|---|
| JP | 10-229768 | 9/1998 |
| JP | U3088484 | 6/2002 |
| JP | 2004-290172 | 10/2004 |
| JP | 2005-006604 | 1/2005 |
| JP | 2005-006605 | 1/2005 |
| JP | 2005-110691 | 4/2005 |
| JP | 2005-110700 | 4/2005 |

* cited by examiner

*Primary Examiner*—Michael R. Mansen
*Assistant Examiner*—Valentina Xavier
(74) *Attorney, Agent, or Firm*—Lowe Hauptman Ham & Berner LLP

(57) ABSTRACT

A pet litter box includes a litter container for storing liquid-passing litter and a liquid-absorbing sheet tray for holding a liquid-absorbing sheet. The front-back direction of the liquid-absorbing sheet can be changed without removing the liquid-absorbing sheet from the tray. The pet litter box includes a litter box main body having an opening from which pets enter. The litter box main body includes a litter container for storing liquid-passing litter formed of plural of granular materials provided therein, a liquid-absorbing sheet placed below the litter container for absorbing the liquid passing through the litter, and a liquid-absorbing sheet tray for holding the liquid-absorbing sheet. The liquid absorbing sheet tray can be withdrawn and removed from the front of the litter box main body and reversible in the front-back direction.

1 Claim, 6 Drawing Sheets

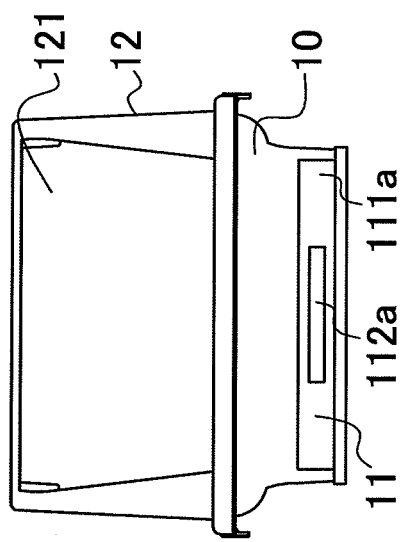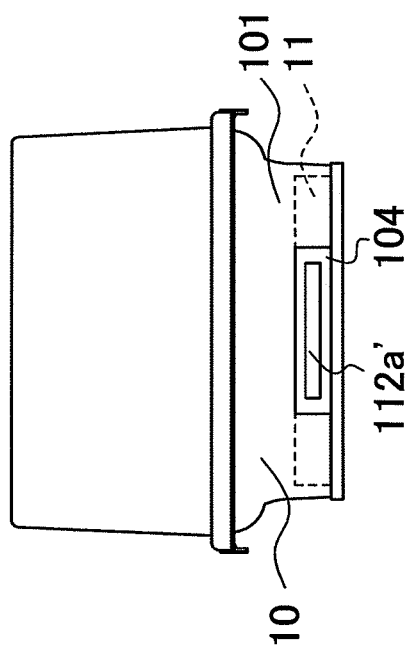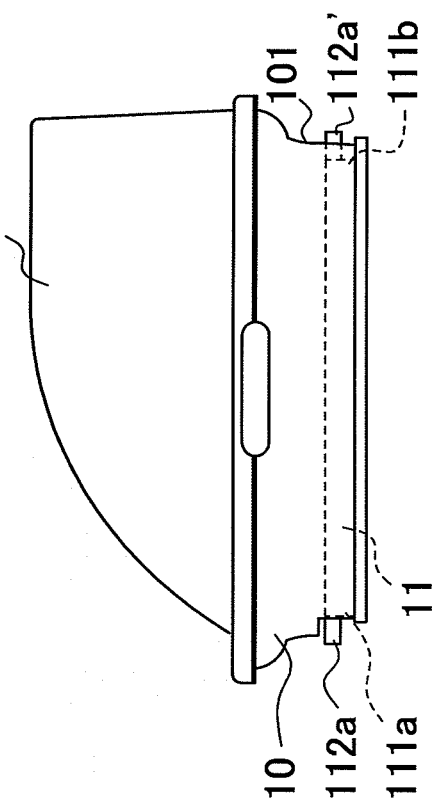

PET LITTER BOX

This application is based on and claims the benefit of priority from Japanese Patent Application No. 2005-187472, filed on Jun. 27, 2005, the content of which is incorporated herein by reference.

BACKGROUND OF THE INVENTION

1. Field of the Invention

The present invention relates to pet litter boxes for pets such as cats kept indoors, and more specifically relates to a pet litter box that can be maintained cleanly and easily by effectively utilizing a liquid-absorbing sheet.

2. Related Art

A plastic container, in which litter composed of granular materials (so called "cat litter") is placed, has been generally used as a litter box for pets such as cats and dogs kept indoors. The granular materials include mineral materials such as zeolite, river sand, bentonite that becomes hard when it absorbs liquid like urine, and cellulose grains that are formed by hardening crushed pulp. A pet such as a cat enters the litter box, and excretes urine or feces on the litter. The owner of the pet removes the litter soiled with urine or feces from the container along with feces using a scoop, and then adds new litter in accordance with the amount of the litter removed.

However, since pets like cats have a habit of mixing litter with their paws after excretion, the amount of the litter soiled with urine or feces is increased and the soiled litter is scattered. Thus, it is difficult to remove only the soiled portion of the litter.

On the other hand, zeolite and river sand do not absorb urine, and bentonite and cellulose grains absorb urine to some extent but cannot absorb it completely. On this account, urine passes through the litter and tends to be retained at the bottom of the container. It takes a long time for this urine to evaporate and urine impurities adsorbed on the litter tend to cause urine odor to emanate. Therefore, the owner must keep the litter box clean by changing all of the litter in the container once a week to two weeks, washing and drying the container, and then placing new litter in the container.

Moreover, discarding litter every time an animal excretes and replacing all the litter once a week to two weeks increase the amount of litter used. When a granular mineral such as zeolite is used as the litter, it is difficult to be discarded as waste because it is non-combustible.

To solve the problems mentioned above, pet litter boxes disclosed in Japanese Utility Model Registration No. 3088484 (Patent Document 1) and Japanese Unexamined Patent Application Publication No. 10-229768 (Patent Document 2) were developed, for example. In the pet litter box disclosed in Patent Document 1, granular materials are placed in a container having a pass partition plate with a streaky water-dripping structure at the bottom. A loadable tray, in which a liquid-absorbing sheet is placed, is disposed below the bottom pass partition plate. Urine passes through the granular materials and through the bottom part of the container, and it is then absorbed by the liquid-absorbing sheet. Also, in the pet litter box disclosed in Patent Document 2, water resistant granular materials are placed in a container having a bottom sheet with a liquid-passing structure. A liquid-absorbing sheet supported by a support is disposed below the bottom part of the container in close contact with the bottom sheet. Urine passes through the water resistant granular materials and through the bottom part of the container, and then is absorbed by the liquid-absorbing sheet. In this way, urine does not remain in the container, and the litter box may be cleaned by putting antimicrobial agents and super absorbent polymers into the liquid-absorbing sheet to prevent rot or bad smell and simply changing the liquid-absorbing sheet once a week. The entirety of the granular material is replaced once a month to once every two months. This readily reduces the amount of waste without much effort.

However, pets such as cats usually urinate at one area on the liquid absorbing sheet, leaving only that area soiled. Thus, the liquid-absorbing sheet is sometimes reused by turning it around so that unsoiled parts of the liquid-absorbing sheet will be at the area at which the pet urinates (according to the inventors' research, among pet owners who use this type of pet litter box, 37% responded that they reuse the liquid-absorbing sheet by turning it around).

To turn around the liquid-absorbing sheet disposed in the tray, it is necessary to remove the liquid-absorbing sheet from the tray and turn it around. However, the liquid-absorbing sheet will be heavy after absorbing urine and will be lost stiffness, which makes it difficult to handle the liquid-absorbing sheet and requires effort to remove the liquid-absorbing sheet and re-disposing it after changing its front-back direction. In the worst case, this may cause inconvenience because the liquid-absorbing sheet fails to absorb urine due to a turn-up of the liquid-absorbing sheet while it is disposed in the tray. Also, it is unsanitary because hands become soiled while handling the liquid-absorbing sheet.

SUMMARY OF THE INVENTION

The present invention has been made in view of the problems mentioned above. An object of the present invention is to provide a pet litter box having an opening formed from the front to upper parts, which includes a litter container for holding liquid-passing litter formed of granular materials disposed in a litter box main body, a liquid-absorbing sheet placed below the litter sand container for absorbing the liquid passing through the litter, and a liquid-absorbing sheet tray for holding the liquid-absorbing sheet, in which the liquid-absorbing sheet may be turned around without removing the sheet from the tray.

As a result of diligent research by the inventors in order to achieve thus object, it was found that the directional change of the liquid-absorbing sheet may be performed without removing the sheet from the tray by withdrawing and removing the tray from the litter box main body and turning it around.

More specifically, the invention provides the following.

In a first aspect of the present invention, a pet litter box includes a litter box main body, in which the litter box main body includes a litter container for holding liquid-passing litter containing plural of granular materials provided therein, a liquid-absorbing sheet disposed below the litter container for absorbing liquid passed through the litter, and a liquid-absorbing sheet tray for holding the liquid-absorbing sheet, the liquid-absorbing sheet tray is removable and detachable from the front of the litter box main body, and is reversible in the front-back direction.

According to the present invention, a liquid-absorbing sheet tray may be withdrawn and removed from the front part of the litter box main body, and is again stored to the litter box main body after it is turned around, resulting in a reversal in orientation of the liquid-absorbing sheet disposed in the tray. In this way, the front-back direction of the liquid-absorbing sheet that absorbs liquid such as urine at one side depending on the preference of pets such as cats can be easily changed without removing the sheet from the liquid-absorbing tray. This makes it possible to use other parts of the liquid-absorbing sheet which have not absorbed liquid and enables a long term usage of the liquid-absorbing sheet.

Also, since the liquid-absorbing sheet can be changed in its front-back direction without being removed from the liquid-absorbing sheet tray, no effort is needed to handle a liquid-absorbing sheet that has become heavy after absorbing urine and has lost stiffness. This eliminates inconvenience of urine leakage due to bending of the liquid-absorbing sheet when it is repositioned and spread in the tray after being removed from the liquid-absorbing sheet tray to change its direction. It also provides sanitary conditions as hands can be kept clean.

Here, the "front-back direction" means a direction in which a liquid-absorbing sheet tray is loaded, and the front part is a side from which the liquid-absorbing sheet is removed.

In a second aspect of the present invention, a pet litter box according to the first aspect of the present invention is one in which the liquid-absorbing sheet tray has handles at the front and back thereof.

According to the present invention, since the liquid-absorbing sheet tray has handles at its front and back, the tray is loaded easily with the handles when its front-back direction needs to be changed for reloading. Articles fixed to the liquid-absorbing sheet tray or strings attached to it may be used as handles. Also, leaf springs may be used as handles, making storing and loading easier.

In a third aspect of the present invention, a pet litter box according to the second aspect of the present invention is one in which a back part of the litter box main body has an opening part at a position where the handle comes into contact therewith.

According to the present invention, the liquid-absorbing sheet tray is stored while the handle at the back part protrudes backward from the opening part formed in the back part of the litter box main body when the liquid-absorbing sheet tray is pushed into the litter box main body. In this way, the liquid-absorbing sheet tray is allowed to be housed in a predetermined position without interfering with the handle in the back part.

In a fourth aspect of the present invention, a pet litter box according to the first aspect of the present invention is one in which the liquid-absorbing sheet tray includes a detachable handle at the front thereof.

By making the handle detachable, the tray can be reinserted after its front-back direction is changed using the same handle. In this way, since it is not necessary to fix handles at the front and back parts of the liquid-absorbing sheet tray, the tray can have a neat structure. Also, the liquid-absorbing sheet tray can be better housed in the litter box main body.

In a fifth aspect of the present invention, a pet litter box according to the first aspect of the present is one in which the liquid-absorbing sheet tray includes an outer tray, and an inner tray housed within the outer tray.

According to the present invention, the liquid-absorbing sheet tray has a double structure in which an inner tray is housed inside of an outer tray, and a liquid-absorbing sheet is disposed within the inner tray. This allows the directional change of the liquid-absorbing sheet by changing the front-back direction of the inner tray without changing the front-back direction of the liquid-absorbing sheet tray.

In a sixth aspect of the present invention, a pet litter box according to any one of the first to fifth aspects of the present invention is one in which the liquid-absorbing sheet tray includes a fixation device for fixing the liquid-absorbing sheet.

According to the present invention, the liquid-absorbing sheet is fixed into the liquid-absorbing sheet tray using a fixation device. This prevents poor attachment of the liquid-absorbing sheet when the liquid-absorbing sheet tray is set into the litter box main body, even if the front-back direction of the liquid-absorbing sheet tray is frequently changed.

The fixation device includes so-called mechanical engagement devices in which hook parts are attached to either the liquid-absorbing sheet or the liquid-absorbing sheet tray and loop materials are attached to one another, and then the hook parts are engaged with the loop materials. The fixation device may also be one formed by a method in which cuts are provided in the liquid-absorbing sheet tray to which the liquid-absorbing sheet is pushed thereinto.

In a seventh aspect of the present invention, a pet litter box according to the sixth aspect of the present invention is one in which the fixation device is a mechanical engagement device provided in the bottom of the liquid-absorbing sheet tray.

According to the present invention, since the fixation device is a so-called mechanical engagement, in which hook parts are attached to either the liquid-absorbing sheet or the liquid-absorbing sheet tray and loop materials are attached to the other, and the hook parts are engaged with the loop materials, the fixation and removal of the liquid-absorbing sheet can be made easily with a one-touch operation.

In an eight aspect of the present invention, a pet litter box according to the seventh aspect of the present invention is one in which the fixation device is cuts that are provided in the bottom of the liquid-absorbing sheet tray and can hold the liquid-absorbing sheet therein.

According to the present invention, since the liquid-absorbing sheet can be fixed by pushing a part of the liquid-absorbing sheet into cuts provided in the bottom of the liquid-absorbing sheet tray, the fixation and removal of the liquid-absorbing sheet can be made easily with a one-touch operation. Here, the cuts include, but are not limited to cross-cuts. Also, the cuts may include holes that are clipped out.

In a ninth aspect of the present invention, a pet litter box according to any one of the first thorough eight aspects of the present invention is one in which the litter box main body includes a stopper for controlling the holding of the liquid-absorbing sheet tray at a predetermined position.

According to the present invention, the liquid-absorbing sheet tray is pushed into the litter box main body and stored in the best position. This allows the liquid-absorbing sheet to be positioned as desired according to where a pet will excrete.

In a tenth aspect of the present invention, a pet litter box according to any one of the first thorough ninth aspects of the present invention is one in which the litter box main body further includes a side cover above the litter container, and the side cover has an opening formed at the front opening to upper parts thereof.

According to the present invention, a pet enters the litter box from an opening entrance formed in a side cover composing the main body when it excretes. If a litter drop device is disposed at the opening entrance, for example, the litter attached between and surrounding the pet paws is removed by the litter sand drop device when the pet exits the litter box after evacuation. This prevents the litter from being scattered in the room.

In an eleventh aspect of the present invention, a method for handling pet wastes using the pet litter box according to any one of the first thorough tenth aspects of the present invention includes a step of reversing the front-back direction of the liquid-absorbing sheet tray.

According to the present invention, the front-back direction of the liquid-absorbing sheet can be changed without removing the liquid-absorbing sheet disposed in the liquid-absorbing sheet tray. This enables prolonged use of the liquid-absorbing sheet. Also, it is sanitary and does not make a person unpleasant because hands can be kept clean.

As described above, according to the pet litter box of the present invention, since the liquid-absorbing sheet tray in which the liquid-absorbing sheet is disposed can be withdrawn and removed from the litter box main body and its front-back direction can be changed, the front-back direction of the liquid-absorbing sheet disposed inside the tray can be changed. This provides prolonged use of the liquid-absorbing sheet, because the front-back direction of the liquid-absorbing sheet can be changed easily without removing the sheet from the liquid-absorbing sheet tray for its continuous usage when liquid such as urine is absorbed in only one side of the liquid-absorbing sheet depending on an excretion situation of pets such as cats.

BRIEF DESCRIPTION OF THE DRAWINGS

FIGS. 2A-2C are views showing a setting condition in which a liquid-absorbing sheet tray is housed into a litter box main body, FIG. 2A is a side view, FIG. 2B is a front view, and FIG. 2C is a rear view.

FIG. 6A is a side view of the liquid-absorbing sheet tray, FIG. 6B is a side view of the inner tray.

DETAILED DESCRIPTION OF THE INVENTION

Embodiments of the present invention will be described herein below in conjunction with the accompanying drawings. However, the invention is not limited by this description.

In this invention, the term "pets" means animals such as dogs, cats, rabbits, and hamsters. Also, the term "litter" means a mass of granular materials formed of spheres, revolving ellipsoids or polyhedrons, and preferably formed of water-resistant silica gels as the main ingredient. Furthermore, the term "liquid" means all fluid mass which is excreted by pets and is capable of passing through the litter of the present invention. The term "liquid-passing" means liquid passing through a point of the litter. Accordingly, the more the liquid passes through the circumference of the granular materials, the better the liquid-passing characteristics are.

Figure 1A:
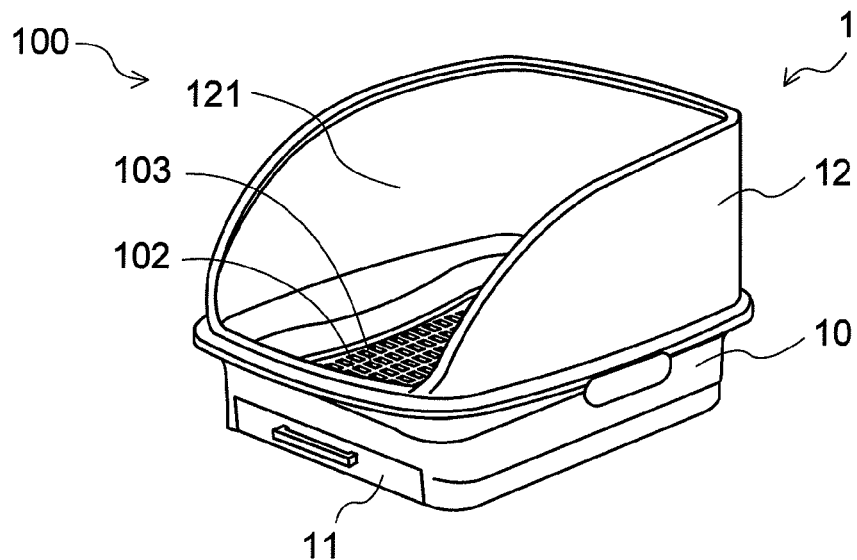
FIGS. 1A and 1B are views showing an embodiment of a pet litter box according to the present invention.

In a pet litter box 100 according to an embodiment, as shown in FIG. 1A, the litter box main body 1 is configured to have main components, an opening 121 extending from the front and opening upside, a litter container 10 having a box shape for storing litter of a number of granular materials, a liquid-absorbing sheet tray 11 loadably incorporated below the bottom part of the litter container 10 for storing a liquid-absorbing sheet, and a side cover 12 disposed above the litter container 10 to cover the side face thereof. The bottom part 102 of the litter container 10 has a plurality of holes 103. Preferably, these holes 103 have a polyhedral or circular shape and a size to prevent litter 13 from falling out.

Figure 1B:
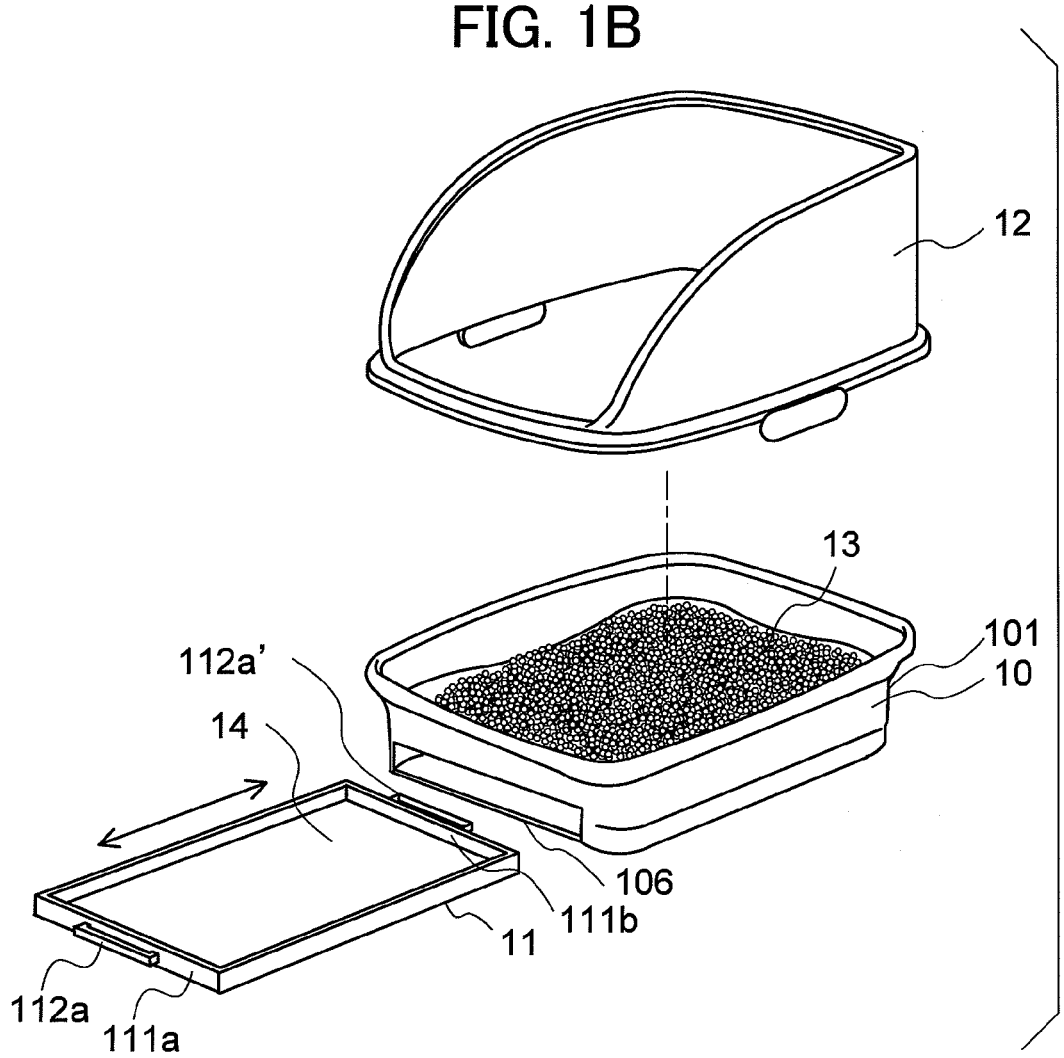

As shown in FIG. 1B, a predetermined amount of the litter 13 is dispersed at a certain thickness on top of the bottom part 102 of the litter container 10 to be piled. The liquid-absorbing sheet 14 is placed in the liquid-absorbing sheet tray 11.

The liquid-absorbing sheet tray 11 is a box-shaped body in which the front side and the back side have a symmetrical shape where a loading direction (direction of the arrow in the figure) conforms to the front-back direction. The front wall 111a and the back wall 111b are respectively attached with handles 112a and 112a'. An opening part 104 is formed in the side wall 101 of the back side (the back side of the loading direction) of the litter container 10 so that the back side handle 112a' can be forced out backward when the liquid-absorbing sheet tray 11 is stored therein (refer to FIG. 2C).

Since the liquid-absorbing sheet tray 11 has the shape described above, it can be removed from either the front wall 111a or the back wall 111b. The side wall 101 of the litter container 10 functions to stop the liquid-absorbing sheet tray 11 and prevent it from being forced further inside. In this way, the liquid-absorbing sheet tray 11 is set to the best position.

FIGS. 2A to 2C show the liquid-absorbing sheet tray 11 set and stored in the litter container 10. The back handle 112a' sticks backward from the opening part 104 that is provided in the side wall of the back of the litter container 10, shown in the side view, FIG. 2A. The back side of the liquid-absorbing sheet tray 11 is housed below the litter container 10 as it is disposed against the side wall 101 of the litter container 10. The side wall 101 of the litter sand container 10 has an opening part 104 formed in a size that the handle 112a' can be forced out as shown in the rear view, FIG. 2C.

Figure 3A:
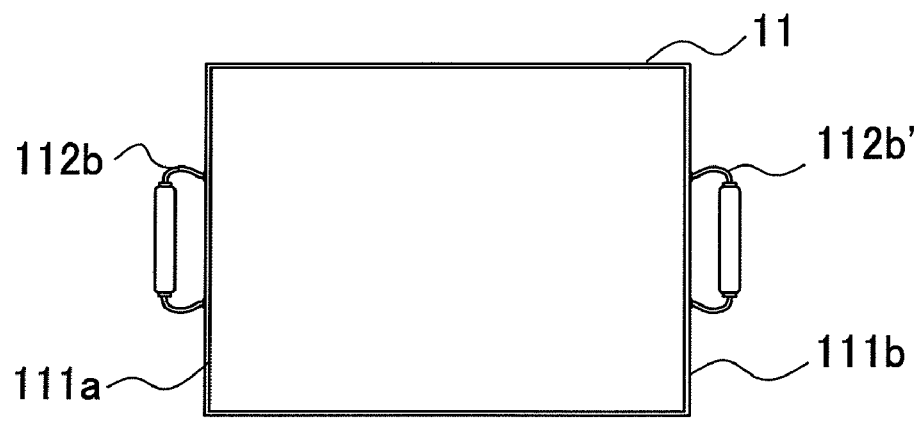
FIGS. 3A-3C are views showing a variety of handles.
Figure 3B:
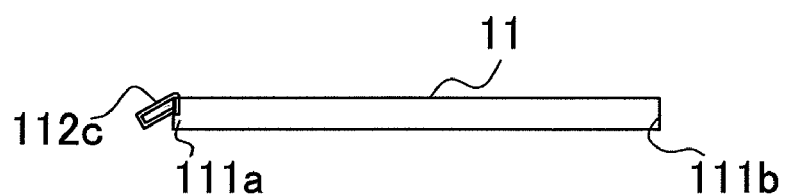
Figure 3C:
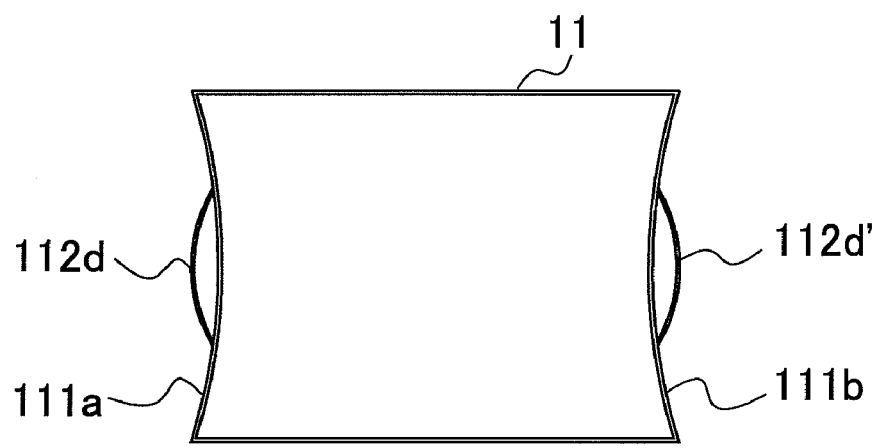

Instead of the fixed handles 112a, 112a' as shown in FIGS. 1A and 1B, handles to be attached to the liquid-absorbing sheet tray 11 may be one shown in FIGS. 3A to 3C, for example. The handles 112b, 112b' shown in FIG. 3A are strings and attached to the front wall 111a and the back wall 111b.

The handle 112c shown in FIG. 3B has an L-shaped hanging part formed at the one end, which can be hanged with the front wall 111a and the back wall 111b for withdrawing. This hanging part is removably attached to the front wall 111a and the back wall 111b. In this way, the liquid-absorbing sheet tray 11 can be withdrawn by attaching the handle 112c to the front wall 111a which is the pet owner's side or to the back wall 111b which becomes the pet owner's side when the front-back direction is changed. The handle 112 can be attached to both walls although the front-back direction will be changed.

The handles 112*d* and 112*d'* shown in FIG. 3C are leaf springs and are attached to the front wall 111*a* and the back wall 111*b*. The leaf spring typically enables easy storage and withdrawal, because the spring usually stored compactly extends and deforms to a shape, making it easy for handling. It should be noted that FIG. 3A shows the handles viewed from above, FIG. 3B shows the handle viewed from the side, and FIG. 3C shows the handles viewed from above.

Figure 4A:
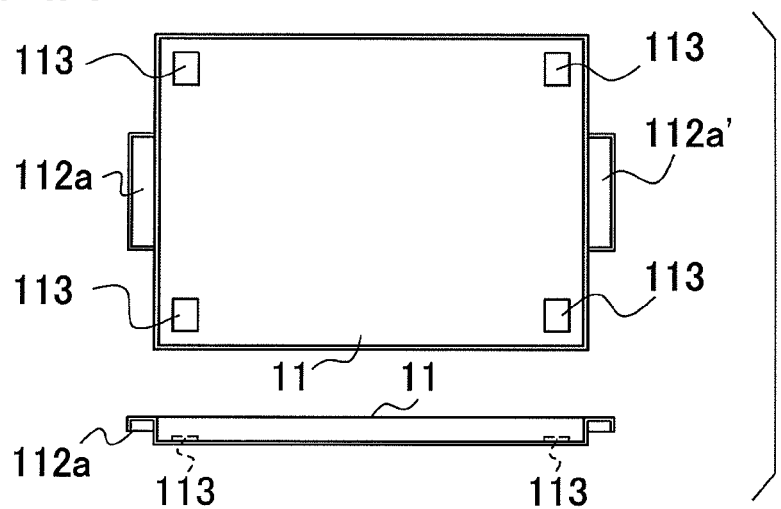
FIGS. 4A-4C are views showing a variety of fixation devices for fixing a liquid-absorbing sheet into a liquid-absorbing sheet tray.
Figure 4B:
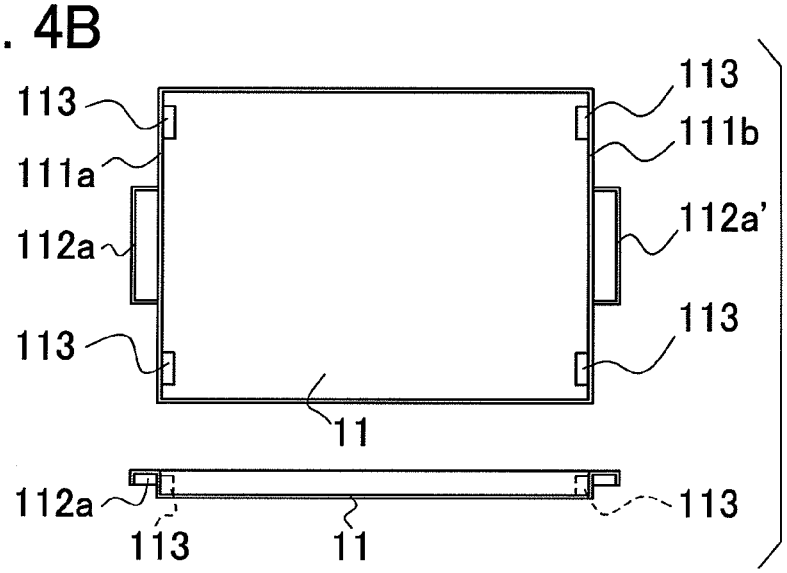
Figure 4C:
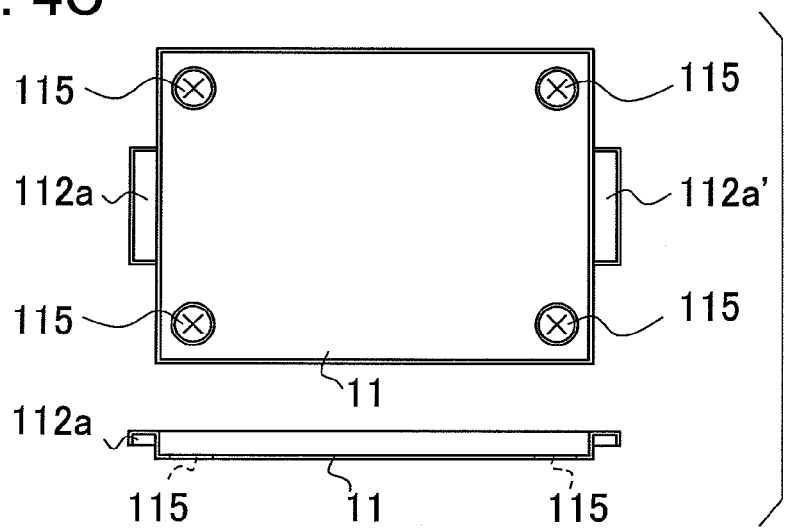

Also, it is preferable to fix the liquid-absorbing sheet 14 to the liquid-absorbing sheet tray 11 by attaching a fixation device such as one shown in FIGS. 4A to 4C. This prevents a poor attachment of the liquid-absorbing sheet 14 when the liquid-absorbing sheet tray 11 is set into the litter box main body even if the front-back direction of the liquid-absorbing sheet tray 11 is frequently changed.

FIGS. 4A to 4C show a variety of fixation devices for fixing the liquid-absorbing sheet 14 to the liquid-absorbing sheet tray 11. FIG. 4A shows hook parts 113 attached at substantially symmetrical positions of the four corners of the bottom of the liquid-absorbing sheet tray 11. Although it is not shown, the hook parts 13 are engaged with loop materials attached to the liquid-absorbing sheet 14 at the positions corresponding to the positions of the hook parts 113, resulting in the fixation of the liquid-absorbing sheet 14 (called "mechanical engagement"). If the liquid-absorbing sheet 14 is made of a material such as non-woven fabric, fibers in front of the non-woven fabric preferably function as loop materials.

FIG. 4B shows hook parts 113 attached at substantially symmetrical positions to the front wall 111*a* and the back wall 111*b* of the liquid-absorbing sheet tray 11. Although it is not shown, the hook parts 113 are mechanically engaged with loop materials attached to the liquid-absorbing sheet 14 at the positions corresponding to the positions of the hook parts 113, resulting in the fixation of the liquid-absorbing sheet 14. This structure is preferable when the liquid-absorbing sheet does not have an absorbing body in the fringe area, because the fringe of the liquid-absorbing sheet can be bent for standing fixation.

FIG. 4C shows cuts 115 having X-marks provided at substantially four corners of the bottom of the liquid-absorbing sheet tray 11. The liquid-absorbing sheet 14 is fixed by forcing the liquid-absorbing sheet 14 into these cuts 115. These cuts 115 are not limited to X-marks, and may include ones having more cuts. Alternatively they can be hole-cuts. In FIGS. 4A to 4C, the upper row shows plane views and the bottom row shows side views.

As described above, the litter container 10 has the opening part 104 formed in the side wall 101 thereof and has the handle 112*a'* sticking backward. In this way, the back wall 111*b* of the liquid-absorbing sheet tray 11 is disposed against the side wall 101 of the litter container 10, which prevents the liquid-absorbing sheet tray 11 being further forced thereinto. In other words, the side wall 101 of the litter container 10 functions as a stopper to stop the liquid-absorbing sheet tray 11. This stopper is not limited but includes stopper shown in FIGS. 5A to 5F, for example.

Figure 5A:
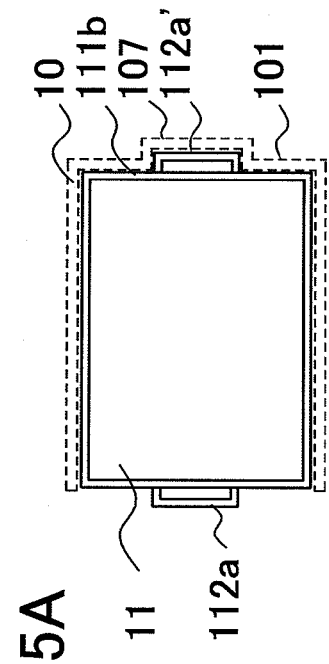
FIGS. 5A-5F are views illustrating a variety of stoppers for preventing a liquid-absorbing sheet tray from being further pushed into a litter box main body when the liquid-absorbing sheet tray is stored therein.

FIGS. 5A to 5F are views illustrating a variety of stoppers for preventing the liquid-absorbing sheet tray 11 from being forced further thereinto. FIG. 5A shows a recess 107 provided in the side wall 101 of the litter container 10 for storing the handle 112*a'*. As the handle 112*a'* is stored in the recess 107, the back wall 111*b* of the liquid-absorbing sheet tray 11 is disposed against the side wall 101 of the litter container 10, providing a structure by which the liquid-absorbing sheet tray 11 is prevented from being forced further thereinto. In this case, the side wall 101 of the litter container 10 functions as a stopper.

Figure 5B:
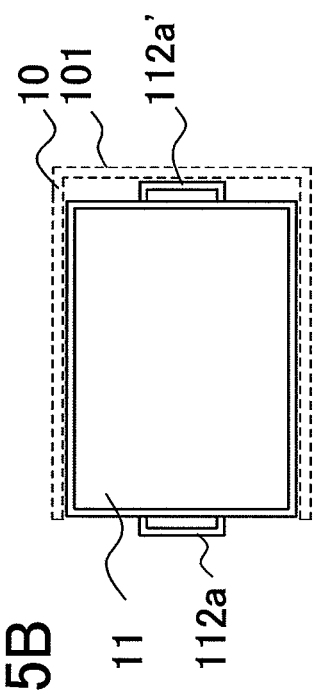

FIG. 5B shows a structure in which the side wall 101 of the litter container 10 functions as a stopper, and the back handle 112*a'* of the liquid-absorbing sheet tray 11 is disposed against the side wall 101, preventing the liquid-absorbing sheet tray 11 from being forced further thereinto. Therefore, in this case, the side wall 101 of the litter container 10 functions as a stopper.

Figure 5C:
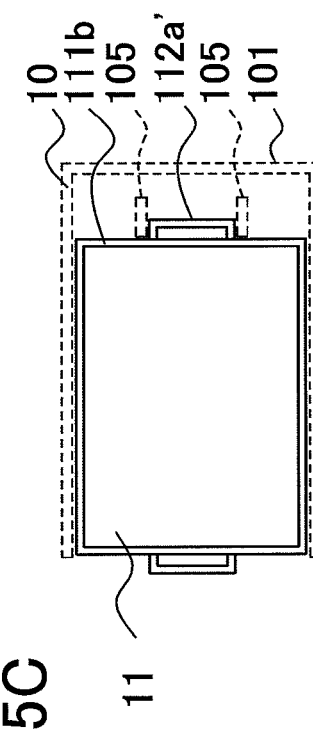

FIG. 5C shows a structure in which narrow plate stoppers 105 are provided in front of the side wall 101 of the litter container 10 at both ends of the back handle 112*a'* in a direction parallel to the loading direction so that the liquid-absorbing sheet tray 11 can stop at the best position. The back wall 111*b* of the liquid-absorbing sheet tray 11 is disposed against these stoppers 105, preventing the liquid-absorbing sheet tray 11 from being forced further thereinto.

Figure 5D:
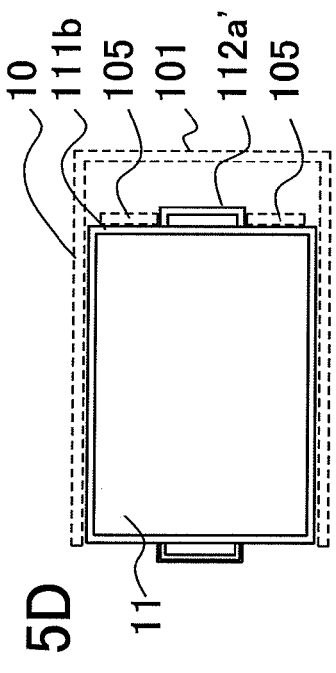

FIG. 5D shows a structure in which the stoppers 105 of FIG. 5C are provided at the both ends of the back handle 112*a'* in a direction perpendicular to the loading direction. The back wall 111*b* of the liquid-absorbing sheet tray 11 is disposed against these stoppers 105, preventing the liquid-absorbing sheet tray 11 from being forced further thereinto.

Figure 5E:
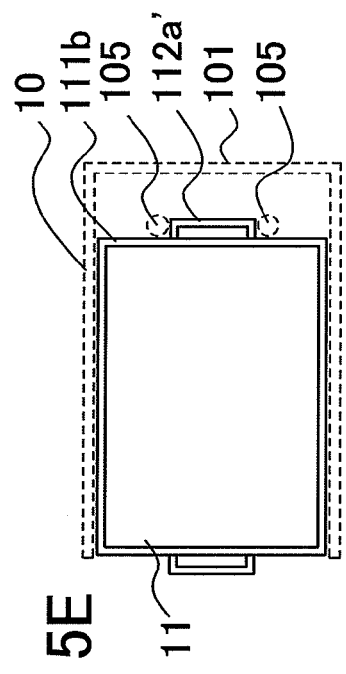

FIG. 5E shows a structure in which the stoppers 105 of FIGS. 5C and 5D are provided as poles. The back wall 111*b* of the liquid-absorbing sheet tray 11 is disposed against these stoppers 105, preventing the liquid-absorbing sheet tray 11 from being forced further thereinto.

Figure 5F:
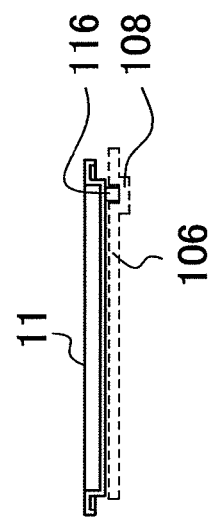

FIG. 5F shows a structure in which a protrusion 116 is formed in the back of the bottom of the liquid-absorbing sheet tray 11. The side wall 101 of the litter container 10 has an opening to enable the loading of the liquid-absorbing sheet tray 11, and a recess 108 is formed so that the protrusion 116 can fit to a bottom plate 106 of the litter container 10. Since the protrusion 116 can fit into the recess 108, the liquid-absorbing sheet tray 11 is stopped at the best position. In this case, the protrusion 116 formed in the back of the bottom of the liquid-absorbing sheet tray 11 and the concave 108 formed in the bottom plate 106 of the litter container 10 function as stoppers.

Here, stopping at the best position means that the liquid-absorbing sheet 14 is held in a position where it can certainly receive liquid that has passed through the litter 13 in the litter container 10.

Figure 6A:
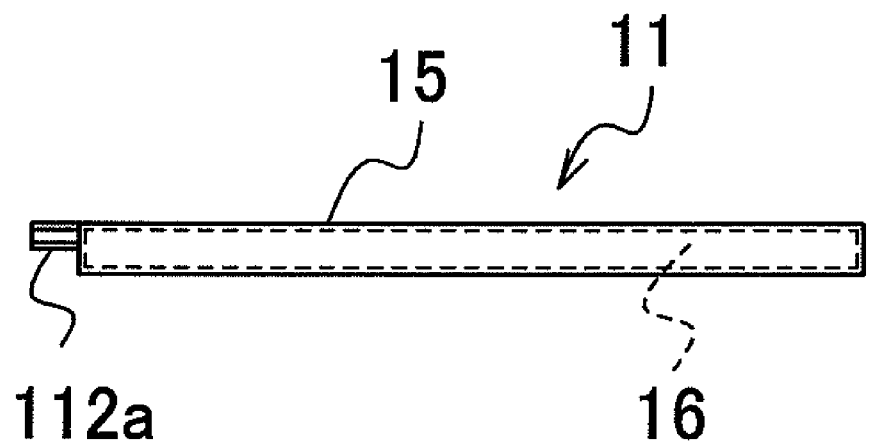
FIGS. 6A and 6B are views showing another embodiment of a liquid-absorbing sheet tray.
Figure 6B:
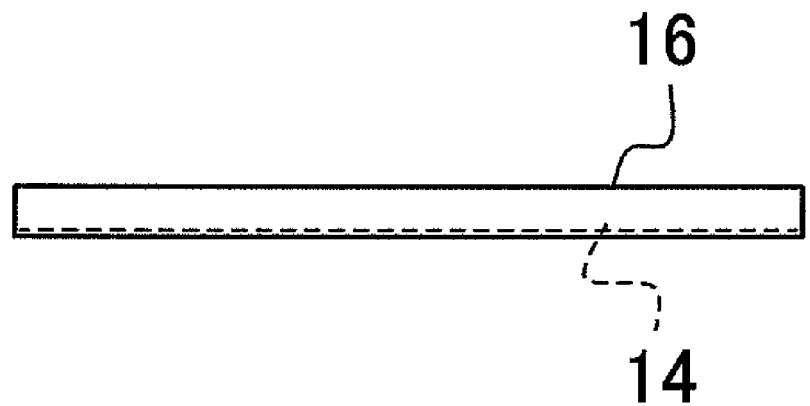

In the above examples, the liquid-absorbing sheet tray 11 has been explained by a structure in which the liquid-absorbing sheet 14 is directly disposed therein. However, as shown in FIG. 6A, the liquid-absorbing sheet tray 11 may be composed of a double structure in which the inner tray 16 shown in FIG. 6B is provided inside of the outer tray 15. Furthermore, the liquid-absorbing sheet 14 is disposed in the inner tray 16. With such a structure, the front-back direction of the liquid-absorbing sheet 14 can be changed by changing the front-back direction of the inner tray 16 of the liquid-absorbing sheet tray 11. In this way, since the liquid-absorbing sheet tray 11 does not require a directional replacement, it can be handled by loading it from one side.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A method of handling pet waste using a pet litter box, said pet litter box comprising:

a litter box main body including:

a litter container for holding liquid-passing granular litter, the litter container including a bottom plate having a plurality of apertures sized for preventing the granular litter from falling out;

a liquid-absorbing sheet disposed below the litter container for absorbing the liquid passed through the litter; and a liquid-absorbing sheet tray for holding the liquid-absorbing sheet, the liquid-absorbing sheet tray including:

opposite front and rear walls which are curved toward each other and toward an interior of the liquid-absorbing sheet tray to define two concave curves, respectively;

a first handle attached to an outside of the front wall and at a central portion of the concave curve defined by the front wall; and a second handle attached to an outside of the rear wall and at a central portion of the concave curve defined by the rear wall;

wherein a rear opening is formed in a rear wall of the litter container for allowing the first or second handle to protrude through the rear opening to an outside of the litter container when the liquid-absorbing sheet tray is placed below the bottom plate of the litter container; and said liquid-absorbing sheet tray is removable from and insertable under the bottom plate through a front opening formed in a front wall of the litter container, and is reversible in the front-back direction so that any of (i) the front wall with the first handle and (ii) the rear wall with the second handle of the liquid-absorbing sheet tray can pass through the front opening of the litter container when the liquid-absorbing sheet tray is inserted under the bottom plate of the litter container;

said method comprising the steps of:

removing the liquid-absorbing sheet tray from under the bottom plate through the front opening of the litter container by holding and pulling one of the first and second handles;

reversing, in the front-back direction, said liquid-absorbing sheet tray; and re-inserting the reversed liquid-absorbing sheet tray through the front opening of the litter container by holding and pushing the other one of the first and second handles.

* * * * *